W. F. DOLL.
RESILIENT WHEEL.
APPLICATION FILED MAY 23, 1911.
1,053,976.
Patented Feb. 25, 1913.
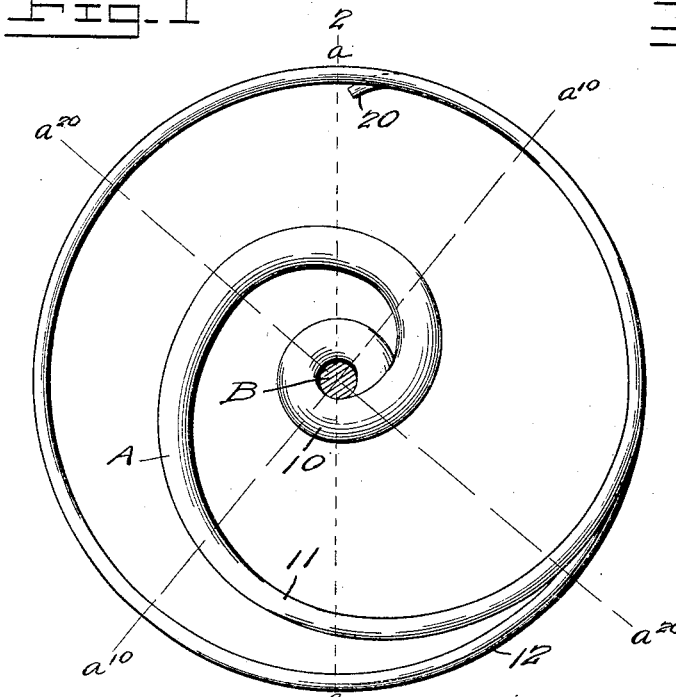
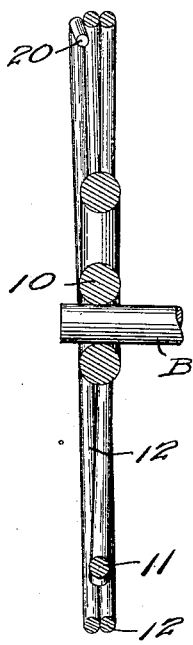
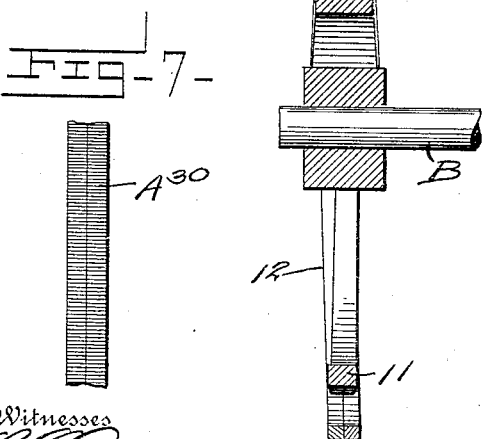
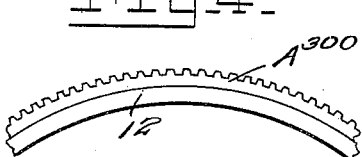
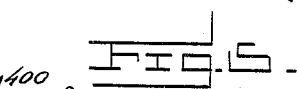
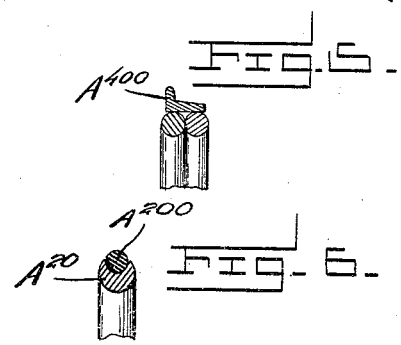
Inventor
William F. Doll.
Witnesses
By C. J. Stockman
Attorney

UNITED STATES PATENT OFFICE.

WILLIAM FREDERICK DOLL, OF LIBERTY, NEW YORK, ASSIGNOR OF ONE-HALF TO LEE McCLUNG, OF WASHINGTON, DISTRICT OF COLUMBIA.

RESILIENT WHEEL.

1,053,976. Specification of Letters Patent. Patented Feb. 25, 1913.

Application filed May 23, 1911. Serial No. 629,003.

*To all whom it may concern:*

Be it known that I, WILLIAM FREDERICK DOLL, a citizen of the United States, residing at Liberty, in the county of Sullivan and State of New York, have invented certain new and useful Improvements in Resilient Wheels, of which the following is a specification.

This invention relates to resilient wheels, pulleys or the like of that type which are formed of a spirally coiled strip of metal, and it has for its most important object the provision of a perfectly balanced wheel of this kind, that is to say, one of such construction that the center of mass is at the axis or center of the wheel.

Another purpose of the invention is to provide a resilient wheel which will yield approximately equally in all directions.

Other purposes and advantages of the invention will appear from the following description of the wheel selected to exemplify the invention.

Referring to the drawings, wherein like characters of reference designate like parts in the several views: Figure 1 is a side elevation of a wheel embodying the present improvements: Fig. 2 is a section thereof on the line 2—2 of Fig. 1: Fig. 3 is a view similar to Fig. 2 but shows the wheel formed from a strip of flat metal: Fig. 4 is a detail view showing an outer rim with gear teeth: Fig. 5 is a detail view showing a flanged rim or tire: Fig. 6 is a detail view showing the felly or rim grooved to receive a tire or belt: and Fig. 7 is a detail view in which the felly or rim is roughened.

The wheel of the present invention is formed from a piece of spring metal, as A in Figs. 1 and 2, or $A^{10}$ in Fig. 3, continuously coiled to form an inner longitudinally-open coiled member 10, an outer member 12 and an intermediate member 11, said piece of spring metal having its weight suitably graduated whereby when it is properly coiled to form the wheel, or that portion thereof between the hub and the felly, the center of mass will be at the axis or hub of the wheel, there being a perfect balancing of the weight on all radial lines passing through said axis, the gradual increase in the weight of the piece of metal toward the inner member 10 compensating for the widening of the curve from said member.

In the accompanying drawings I have exemplified the invention in what I consider to be a practical embodiment thereof, the wheel therein shown being formed of a single piece of metal of gradually decreasing cross sectional area for a suitable distance from its inner end, and having its said inner end bent into a coil 10 to form what may be regarded to be the hub of the wheel, and thence extending spirally or approximately so from said coil to form a spoke 11 and thence around circularly to form what is herein termed the felly 12.

The graduation of the metal should be so proportioned to the radius of the coils that the portions of the wheel on opposite sides of lines drawn through the axis will balance each other; thus, for example, the two portions on opposite sides of the line $a$—$a$ should balance, as should also the two portions on opposite sides of the line $a^{20}$—$a^{20}$.

The particular cross sectional shape of the metal piece A, the number of spiral convolutions thereof forming the spoke-portion of the wheel (that is, between the hub and the felly) and the number of circular convolutions forming the felly, and others of the exemplified details may be varied without departing from the essential principles of the invention or the scope of the subjoined claims.

In the several forms herein illustrated the referred to gradual decrease in the weight of the metal from the hub outward is secured by tapering the piece A or $A^{10}$ in a suitable part of its length, but any other suitable way of graduating its weight may be resorted to.

It will be noted, particularly upon reference to Figs. 2 and 3 of the drawing that the correlation of the several parts of the wheel therein shown is such that the inner coiled member 10 is formed from the wider end of the strip of metal, and that the intermediate member of the wheel is formed from a portion of the metal which is narrower than the end forming the inner member and is arranged over the center of said inner member, and that the portion of the metal which forms the felly is formed of two convolutions arranged side by side and closely together and are disposed over the central portion of the intermediate member. Thus a line drawn through the transverse center of the felly will intersect the transverse centers of the intermediate member and inner member. Moreover, the felly shown as being formed of two convolutions has a width less than that of either the intermediate member or the inner member. The structure referred to contributes materially to the resilience of the wheel, to the economy with which it may be produced, and to its strength, as well as contributing to the placing of the center of mass at the axis of the wheel.

A very desirable cross sectional shape of the piece is round, as shown at A in Figs. 1 and 2, but it may be oblong, as shown in Fig. 3, where it is designated $A^{10}$, or of other suitable shape, and the outer surface of that portion thereof which forms the felly may be concave, as shown at $A^{20}$ in Fig. 6, to receive a tire or round belt, $A^{200}$, or roughened, as shown at $A^{30}$, in Fig. 7, to increase its grip upon a roadbed or for other purposes.

The part herein designated the felly may form the rim or tread of the wheel, or it may be encircled by a separate rim or tread, which may be cogged, as shown at $A^{300}$ in Fig. 4, flanged as shown at $A^{400}$, Fig. 5, plain or otherwise as preferred.

B designates an axle spindle, shaft or the like which in the present exemplification of the invention extends through the longitudinally open inner coiled member 10 and upon which the wheel is mounted and 20 designates the outer end of the piece of metal which in the herein exemplified forms of the invention is bent inward from the plane of the outer surface of the felly for an obvious reason.

Having thus described the invention what I believe to be new and desire to secure by Letters Patent, is:

1. A spring wheel, formed of a piece of spring metal continuously coiled to provide an inner member, an outer member and an intermediate member, the intermediate member connecting the inner and outer members with each other and being of approximately spiral form and of decreasing weight gradually along its length from the inner member, the graduation in the weight of the metal being proportioned to the radius of the coils, whereby the center of mass is at the axis of the wheel.

2. A spring wheel comprising a continuous piece of spring metal coiled to form an inner member, a felly and a member connecting the inner member and felly with each other, said piece of metal being tapered from one end toward the other, the heavier end being at the inner member and said taper being so proportioned to the increase in the radius of the convolutions from the axis of the wheel outward that the center of mass will be at the axis of the wheel.

3. A spring wheel comprising a continuous piece of spring metal coiled to form an inner member having a longitudinally-open coil, an outer member disposed over the longitudinal center of the inner member and an intermediate member connecting the inner and outer members with each other, said piece of metal being tapered from one end toward the other and having its wider end forming the inner member.

WILLIAM FREDERICK DOLL.

Witnesses:
H. P. HOWARD, Jr.,
CLARENCE MILLER.

---

Copies of this patent may be obtained for five cents each, by addressing the "Commissioner of Patents, Washington, D. C."